United States Patent [19]

Kawai

[11] Patent Number: 4,458,990

[45] Date of Patent: Jul. 10, 1984

[54] ADJUSTING MECHANISM FOR LENS MOUNTING ASSEMBLY

[75] Inventor: Tohru Kawai, Kanagawa, Japan

[73] Assignee: Canon Kabushiki Kaisha, Tokyo, Japan

[21] Appl. No.: 289,177

[22] Filed: Aug. 3, 1981

[30] Foreign Application Priority Data

Aug. 7, 1980 [JP] Japan .................... 55-111981[U]
Aug. 7, 1980 [JP] Japan .................... 55-111982[U]
Aug. 12, 1980 [JP] Japan .................... 55-114038[U]

[51] Int. Cl.³ .............................................. G02B 7/10
[52] U.S. Cl. ................................................... 350/429
[58] Field of Search ....................................... 350/429

[56] References Cited

U.S. PATENT DOCUMENTS 2,984,167 5/1961 Staubach ............................ 350/429
3,897,998 8/1975 Someya et al. ..................... 350/429

Primary Examiner—John K. Corbin
Assistant Examiner—Rebecca D. Gass
Attorney, Agent, or Firm—Toren, McGeady and Stanger

[57] ABSTRACT

An adjusting mechanism for the mechanical mounting arrangement of a lens assembly operative to enable lens components to be axially adjusted for appropriate positioning during the assembly operation of the device. A guide member is provided for guiding a lens mounting member along a linear guide slot in a cylindrical member, the guide member engaging with the guide slot and connected to the lens mounting member. An eccentric adjusting device operates to adjust the axial position of the movable lens mounting member, the structure and arrangement of the eccentric device being such that after appropriate positioning of the movable lens group has been performed, the assembly may be firmly locked in the adjusted position without the danger of inadvertent misalignment.

7 Claims, 16 Drawing Figures

ADJUSTING MECHANISM FOR LENS MOUNTING ASSEMBLY

The present invention relates generally to lens assemblies particularly useful for photographic cameras and more particularly to a mechanical mounting arrangement for a lens assembly which includes an adjusting mechanism for the objective lenses. More specifically, the invention is directed to a device for enabling adjustment of the axial position of a lens holder during assembly of the lens system.

In lenses which are capable of both focusing and zooming operation, when the lens holders for the focusing and zoom components are assembled with their control mechanisms on the interior of the tubular body or lens barrel of the assembly and of a zoom control cam barrel of the assembly, it is necessary to effect a fine adjustment of the axial position of each of the lens holders with reference to the lens barrel and the distance adjusting ring or to the zoom actuator barrel.

In conventional adjusting devices for this purpose, there has been utilized an eccentrically mounted screw which, upon rotation thereof, causes the lens holding member to be axially moved relative to a fixed barrel member of the lens assembly. Usually, in such devices, the screw is eccentrically located within a cam member, with the cam member engaging within a cam groove within the fixed barrel member of the lens assembly. The end of the screw extends through the cam member into fixed engagement with the lens holding member and by rotation of the screw, the cam member engages within the cam groove of the fixed barrel and causes the lens holding member to be moved axially relative to the fixed barrel member.

With a device of this type, when it is desired to establish a prescribed axial positioning of a lens along the optical axis, the operator must loosen the screw and then effect rotation of the cam member while the screw is loosened until the axial position of the lens is finely adjusted. Subsequently, the screw must be tightened in order to fix the adjusted angular position.

With adjustment mechanisms of this type, problems may arise with regard to the total amount of movement which the device may be capable of effecting in order to provide the required adjustment.

Another problem arises in that even if the lens member is set to a finely adjusted desired position, tightening of the screw after the adjustment process has been completed may cause undesired movement of the parts thereby causing misalignment of the adjusted position.

Further disadvantages arise with conventional adjustment mechanisms in that they will usually require that the parts be dimensioned within rather severe tolerances. This gives rise to increases in the cost of manufacture thereby making the overall product less economical. Furthermore, foreign particles are likely to become lodged between the inner and outer surfaces when the mounting mechanism is operated. If this occurs, rapid setting of the focusing ring or of the zoom actuator ring becomes difficult to perform.

In view of the foregoing, the present invention is directed toward providing an adjusting device which is capable, when applied to a zoom lens assembly, of enabling adjustment of the axial position either of a lens mounting member for the variator lens of the assembly, or of a lens mounting member for the compensator lens of the assembly in accordance with prescribed data.

The invention is directed toward enabling provision of a lens assembly with the variator or compensator lens moveable with a high degree of accuracy of the zoom control.

Furthermore, the invention seeks to provide a zoom lens mounting mechanism wherein the lens mounting member for the variator lens or the compensator lens is affixed to a guide member so that the lens mounting member may be moveable along the optical axis, with the guide member being made to move along a desired path to effect change in image magnification and compensation for abberations wherein an adjusting mechanism enables adjustment of the relative position of the guide member and of the lens mounting member to enable adjustment of the position of the optical lens along the optical axis.

SUMMARY OF THE INVENTION

Briefly, the present invention may be described as an adjusting mechanism in a mechanical mounting arrangement for a lens assembly comprising a cylindrical member having first guide means for controlling axial movement of moveable lens groups of said lens assembly, a lens mounting member for mounting said moveable lens groups, a guide member for guiding said lens mounting member along said first guide means of said cylindrical member, said guide member engaging with said first guide means and connecting with said lens mounting member, and eccentric means for adjusting the axial position of said moveable lens mounting member, said eccentric means being held in said guide member and upon adjustment of the eccentricity thereof rendering it possible to adjust the axial position of said lens mounting member.

Accordingly, the present invention provides a lens mounting mechanism wherein a guide member is provided with adjusting means for adjusting the position of the lens mounting member relative thereto and with engagement means for permitting a zoom actuator to move the lens mounting member whereby the lens mounting member is driven to move on the interior of the lens assembly for zooming purposes by the engagement means and wherein the adjustment of the relative position of the lens mounting member and the guide member to each other is enabled by the adjusting means so that the lens mounting member moves along a prescribed path during the zooming operation.

The present invention provides a control mechanism for axially moving a lens mounting member for mounting a focusing member constructed in such form that the guide member fitted in a straight guide slot of a tubular body or fixed lens barrel is connected to the lens mounting member for the focusing lens groups and is moved to follow a path formed in the circumferential surface of the cam barrel and to provide an adjusting mechanism for arranging the lens mounting member in a predetermined position on the optical axis of the lens assembly.

With the present invention, a mounting mechanism is provided for axial movement of the lens mounting member in a cylindrical lens barrel thereby to provide a mounting mechanism which allows for coincidence in positioning of the axes of the cylindrical lens barrel and the lens mounting member constituting a lens assembly with respect to the optical axis with a high degree of accuracy.

The invention is further concerned with provision of a lens barrel of such construction wherein the moveable lens mounting member is mounted in the cylindrical lens barrel, and wherein, in order to effect coincidence with the optical axis with high accuracy, a straight guide slot is provided in the cylindrical lens barrel. A guide member is fitted in the straight guide slot and the moveable lens mounting member is affixed to the guide member. The moveable lens mounting member is held in the cylindrical lens barrel by the guide member in suspended relationship. By making the fitting of the guide member and of the straight guide slot to the form of a tapered surface fitting, there is insured coincidence of the axes with the optical axis with high accuracy.

Thus, the invention enables provision of a mechanism which permits improvement in the fitting precision of the straight guide slot and of the guide member.

With particular regard to the structure and arrangement of the lens assembly, the lens mounting member is connected to the guide member fitted in the straight guide slot of the tubular body and axial movement of the guide member is controlled by actuation from exteriorly of the lens barrel for the purpose of maintaining a good fitting engagement of the guide member in the straight guide slot. Also, there is provided a mechanism for reducing the pressure of the guide member on the sliding surfaces of the straight guide slot with the advantage that the load on the actuator may be lessened and also that the gap between the guide member and the straight guide slot may be eliminated.

In view of the present invention there may be provided a variety of forms of the guide slot for guiding the lens mounting member in axial directions in fitted relationship with the straight guide slot of the tubular body and there may be provided a guide member which is amenable to low production cost techniques using synthetic resin materials formed by molding means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
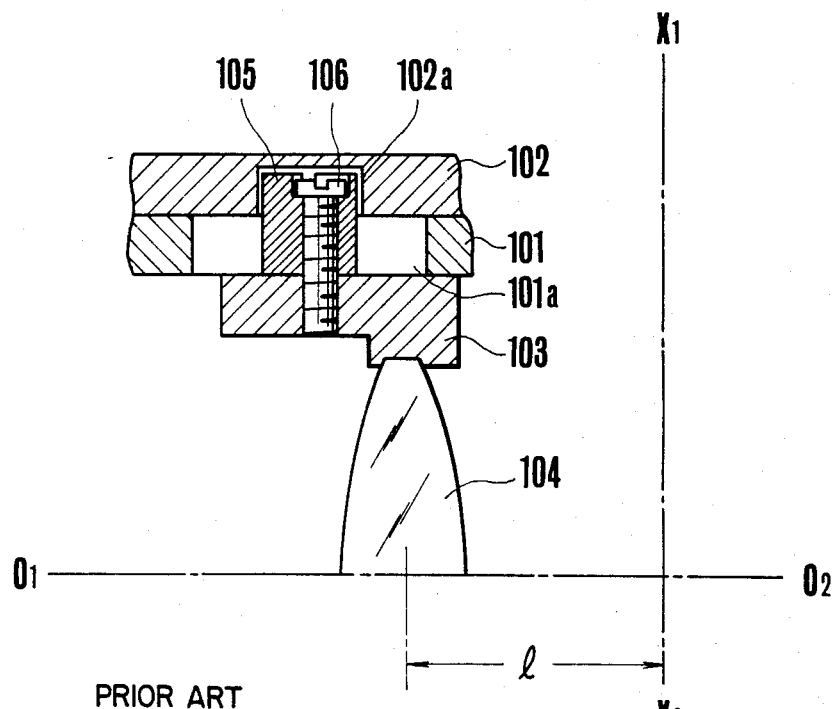
FIG. 1 is an axial sectional view of a lens arrangement of the type wherein the present invention may be applied but depicting a conventional position adjusting device.
Figure 2:
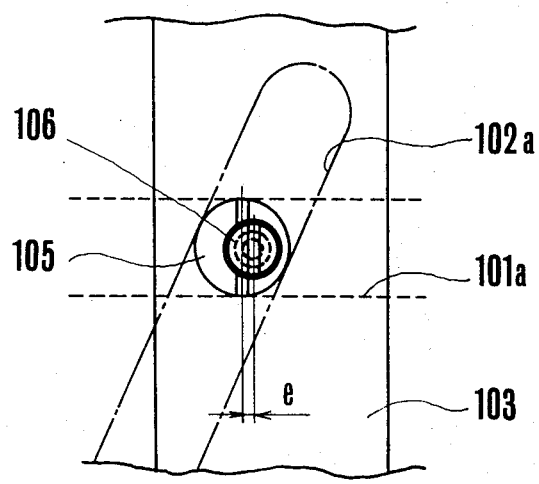
FIG. 2 is a fragmentary side view of the device depicted in FIG. 1.

In FIGS. 1 and 2 there is shown part of a lens system of the type to which the present invention may be applied wherein a conventional position adjusting device in accordance with the prior art is depicted. Devices of the type to which the present invention relates, such as that shown in FIGS. 1 and 2 utilizing a conventional position adjusting device, comprise a tubular body or lens barrel 101 constituting part of the mechanical mounting mechanism for the zoom lens assembly. Formed in the tubular body 101 is a linear or straight slot 101a. A cam barrel 102 is fitted on the tubular body 101 and is formed with a cam groove 102a formed in the inner surface thereof, as shown in FIG. 2. A lens holding member 103 is utilized for holding either a variator lens or a compensator lens 104, with the member 103 being fitted in the inner diameter of the tubular body 101. An eccentric roller 105 extends radially from the lens holder 103 through the linear slot 101a into the cam groove 102a and it is retained on the lens holder 103 by a screw 106. The distance between a point at which the axes of the linear slot and the cam groove intersect and the axis of the eccentric roller 105 is denoted e.

With a device constructed in the manner depicted in FIGS. 1 and 2, when it is desired to establish a prescribed distance l between the lens 104 and a reference location $X_1$–$X_2$ along an optical axis $O_1$–$O_2$, the operator must rotate the eccentric roller 105 while the screw 106 is in a loosened condition until the axial position of the lens 104 is finely adjusted. Subsequently, the screw 106 must be tightened to affix the angular position of the eccentric roller 105.

In a case such as that described, the range of axial movement of the lens holder 103 during fine adjustment will be a maximum of twice the distance e. However, because of the limitation of the size of the screw 106, there may arise problems in that the amount of adjustment cannot be increased.

A further problem which may arise with a device of this type is that even if the lens holder 103 is set in an adjusted position, tightening of the screw 106 after the adjustment operation may cause or induce movement of the eccentric roller 105 thus misaligning the established adjustment in the positioning of the lens holder 103.

In a prior art device of the type shown in FIGS. 1 and 2, since the screw 106 lies at the intersection point of the linear slot 101a and the cam groove 102a, the precision of adjustment of the position of the lens holder 103 by the screw 106 will directly affect the accuracy of focusing adjustment. In the case of zoom component holders, the accuracy of indexing of the zoom ratio will directly depend upon this precision of adjustment.

It should be pointed out that in mounting mechanisms of this type with the conventional lens mounting system, the arrangement and construction of the lens mounting member mounting the lens groups of the assembly on the interior of the tubular body or cylindrical barrel is structured in a hollow cylindrical form. A lens group is put into the inside of the hollow cylinder and then tightened by a retainer ring. Such a hollow cylindrical member is fitted in the entire area of the inner surface of the cylindrical barrel and is made moveable therein.

In order that conventional mounting mechanisms may operate smoothly, the outer surface of the hollow cylinder carrying the lens group and the inner surface of the cylindrical barrel must be finished within very limited tolerances. This is not advantageous from the viewpoint of providing an economical structure. Furthermore, as previously indicated, foreign particles may migrate between the outer and inner surfaces when the mounting mechanism is operated and if so, rapid setting of the focusing ring or zoom adjuster ring may encounter difficulty.

In order to overcome the difficulties of the prior art, a lens system of the type depicted in FIGS. 1 and 2 may be provided with a position adjusting mechanism in accordance with the present invention of the type depicted in FIGS. 3-6 wherein an embodiment of the invention applied to a zoom lens mounting mechanism is shown.

Figure 3:
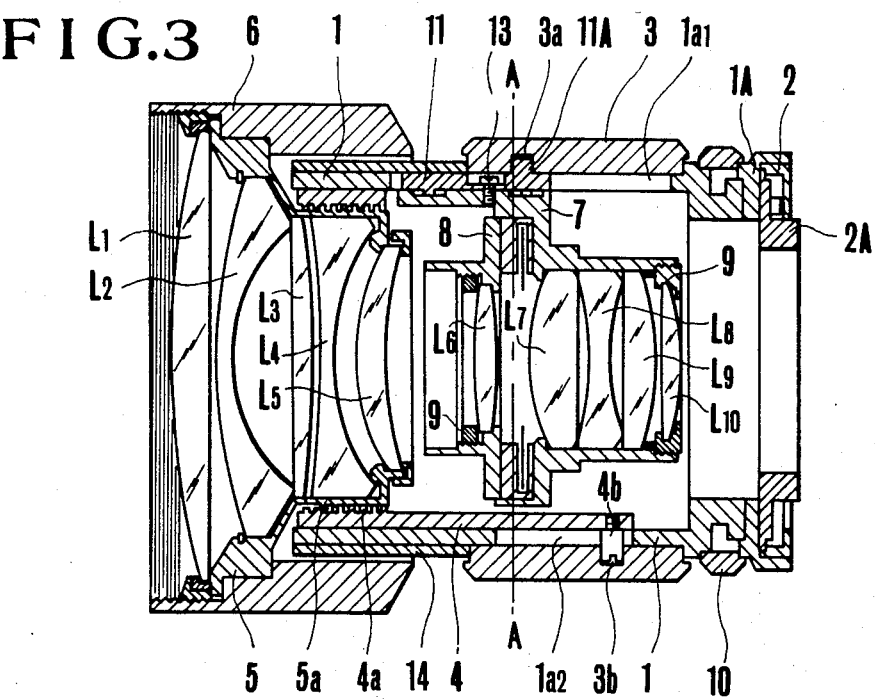
FIG. 3 is an axial sectional view showing a mechanical mounting for a zoom lens assembly formed in accordance with a first embodiment of the present invention.
Figure 4:
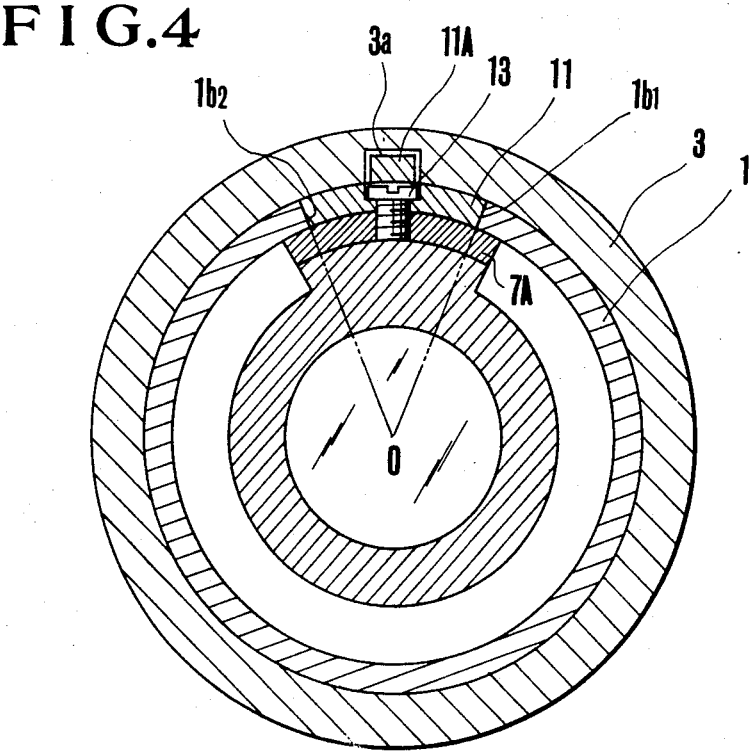
FIG. 4 is a cross-sectional view taken along the line A—A of FIG. 3.

As indicated in FIG. 3, the lens assembly embodying the present invention comprises a zoom lens mounting assembly having a tubular body 1 provided with two linear slots $1a_1$ and $1a_2$ extending parallel to the optical axis of the system. The axial side surfaces of the slots are indicated at $1b_1$ and $1b_2$ and they are shaped in conformance with the respective radii relative to the common center at the optical axis 0 as shown in FIG. 4. Otherwise, they may be tapered with a moderate slope relative to the tangent. At the rear end of the tubular body 1 there is shown coupling means 2 which may, for example, comprise a bayonet mounting mechanism.

The lens assembly includes a bayonet mount retainer ring 1A affixed to the tubular body 1 and an adapter member 2A rotatably fitted in the bayonet mount retainer ring 1A, the adapter member 2A having an attachment reference surface which is effective in mounting the lens assembly upon a camera body (not shown). Between the retainer ring 1A and the adapter member 2A there is a lock mechanism for maintaining the lens assembly and the camera body in a predetermined spatial relationship relative to each other before and after the lens assembly is attached to the camera body.

Since the construction and operation of the mount retainer ring 1A and the adapter member 2A with the locking mechanism are not related to the essential features of the invention, they will not be described in greater detail, but for further description thereof reference is made to U.S. Pat. Nos. 4,247,190 and 4,230,403.

A cam barrel member 3 is fitted on the tubular body 1 so as to be rotatable relative thereto about the optical axis. The cam barrel 3 has cam grooves $3a$ and $3b$ formed on the inner circumferential surface thereof for controlling the amount of movement of lens holders 7 and 8 along the optical axis.

A helicoid ring 4 is fitted in the inner diameter of the tubular body 1 and has a helicoid thread $4a$ meshing with a helicoid thread $5a$ on a first lens holder member 5 for a first lens group of lens elements $L_1$ to $L_5$. Mounted on the ring 4 is a pin $4b$ located at the point of intersection of the linear slot $1a_2$ and the cam groove $3b$.

Figure 5A:
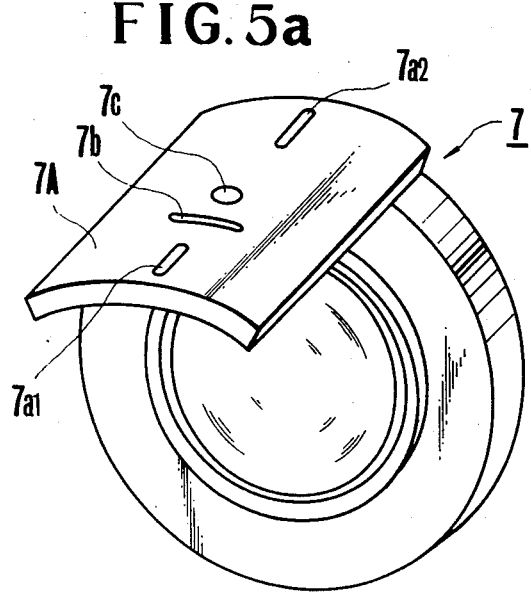
FIGS. 5(a) and 5(b) are perspective views showing parts of the adjusting system of the invention.

The lens assembly also includes a distance adjusting or focusing ring 6 connected to the first lens holder member 5 and arranged at the outermost position of the lens mounting mechanism. The lens holder members 7 and 8 contain a second lens group of lens elements $L_6$ to $L_{10}$ and are configured with a nearly cylindrical shape as shown in FIGS. 4 and 5(a). The lens elements $L_6$ to $L_{10}$ are spaced within the holder members 7 and 8 by spacers and retaining rings 9, and the holder members 7 and 8 are joined together by screw fasteners (not shown).

A diaphragm unit which is only schematically shown in FIG. 3 is positioned in the space between the lens holder members 7 and 8 and it is operatively connected with a diaphragm setting ring 10 which is fitted on the tubular body 1.

A guide member 11 is fitted in the linear slot $1a_1$ of the tubular body 1 and has axial side surfaces $11a_1$ and $11a_2$ in contact with tapered side surfaces $1b_1$ and $1b_2$ of the linear slot $1a_1$. It should be noted that the cross-sectional configuration of the guide member 11 is configured with an arcuate shape coaxial with the tubular body 1 with the side surfaces of the guide member 11 matching the tapered side surfaces of the linear slot $1a_1$ thereby advantageously assuring smooth operation.

Figure 5C:
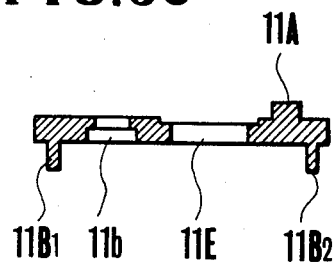
FIG. 5(c) is a sectional view of the part shown in FIG. 5(b)
Figure 5B:
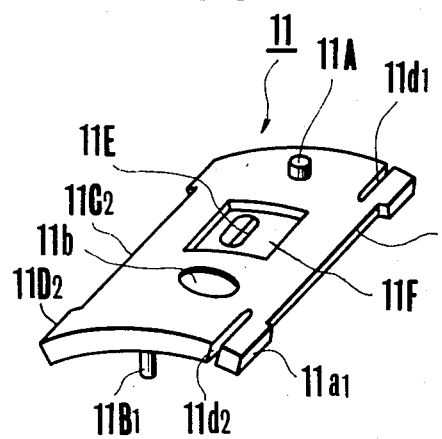
Figure 5D:
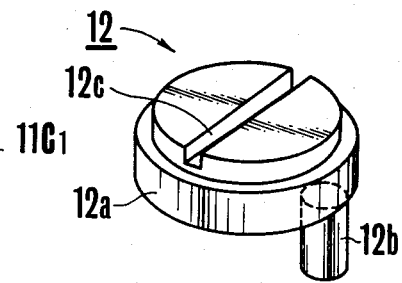
FIG. 5(d) is a perspective view of an eccentric adjusting member of the invention.
Figure 6:
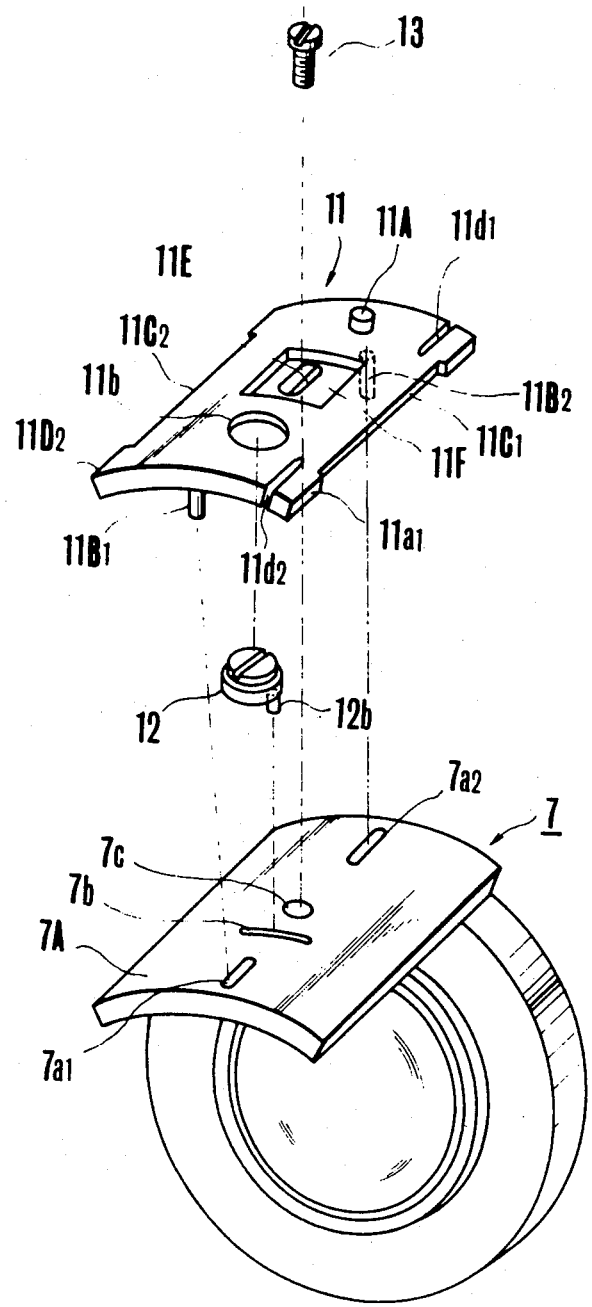
FIG. 6 is an exploded view showing in perspective parts of the adjusting system of the invention.

In order to reduce frictional resistance as the guide member 11 is operatively moved and in order to heighten the stability of operation during sliding movement thereof, the guide member 11 is provided with recessed portions $11c_1$ and $11c_2$ shown in FIG. 5(b) and also seen in FIG. 6. The guide member 11 is also provided with open-ended slots $11b_1$ and $11d_2$.

The guide member 11 is also provided with a pin 11A on the upper surface thereof adapted to engage in the cam groove $3a$ of the cam barrel 3. Furthermore, engagement pins $11B_1$ and $11B_2$ are provided on the lower surface of the guide member 11 and a round hole $11b$ within which a round portion $12a$ of an eccentric adjusting member 12 may engage is also provided in the guide member 11. An elongated slot 11E provided in the guide member 11 operates to effect constraint with the lens holder member 7 at a support portion 7A formed as axially extending from the outer diameter thereof. A recessed portion 11F is provided for containing the head of a screw fastener in the slot 11E.

The support portion 7A forwardly extending from the lens holder member 7 is provided with two axially elongated slots or grooves $7a_1$ and $7a_2$ in which the engagement pins $11B_1$ and $11B_2$ are engaged (see FIGS. 5(c) and 6). A transversely elongated slot or groove $7b$ on the member 7 is arranged for engagement therein of an engagement pin $12b$ formed on the eccentric adjusting member 12. A screw-threaded hole $7c$ meshes with a screw fastener to fixedly mount the lens holders 7 and 8 on the guide member 11.

The guide member 11, the support portion 7A of the lens holder member 7 and the eccentric adjusting member 12 constitute the position adjusting device of the present invention and the interrelationship of these elements will be best understood from the exploded view of FIG. 6.

In the assembly process and the process for adjusting the mechanism of the present invention, the guide member 11 is placed into the linear slot $1a_1$ of the tubular body 1 and the upper pin 11A is brought into engagement with the cam groove $3a$ of the cam barrel 3. The eccentric adjusting member 12 is then positioned in the round hole $11b$ of the guide member 11 and a screw fastener 13 is inserted through the slot 11E in order to engage with the screw-threaded hole $7c$ while the lower pins $11B_1$ and $11B_2$ are in engagement with the respective slots $7a_1$ and $7a_2$ with the adjusting pin $12b$ being in engagement with the slot $7b$.

Upon preliminary tightening of the screw fastener 13, the lens holders 7 and 8 will be placed in an initial position relative to the guide member 11.

If this initial position is not adequate to establish the prescribed distance between a reference point of the second lens group $L_6$-$L_{10}$ and a reference point on the mechanical mounting (indicated at $X_1$-$X_2$ in FIG. 1), the operator will then rotate the eccentric adjusting member 12 by utilizing a screwdriver engaging within the slot $12c$. As the eccentric adjusting member 12 rotates within the hole $11b$ of the guide member 11, the eccentric pin $12b$ will move in a circular path. As a result of engagement of this pin in the transverse groove $7b$, the pin $12b$ will change the axial position of the lens holders 7 and 8 relative to the guide member 11.

After a specific distance l has been established in accordance with design values, the screw fastener 13 is further tightened so that the second lens holder assembly 7, 8 can no longer accidentally shift from its prescribed position and the eccentric adjusting member 12 is also restrained from rotation by pressure of the guide member 11 against the support member 7A.

Upon operation of the position adjusting mechanism as indicated, the second lens group $L_6$-$L_{10}$ will be placed in correct position in the entire zooming range. Thus, optical performance of the zoom lens assembly will be enhanced.

The assembly is provided with an intermediate barrel 14 covering the outer periphery of the tubular body 1.

It will be appreciated from the foregoing description that the present invention is concerned with a lens mounting assembly having a moveable lens holder located within a tubular body which enables adjustment of the axial position of the lens holder during assembly of the lens system, the invention being directed toward providing a position adjusting mechanism which comprises a guide member 11 moveably fitted in an axially elongated slot $1a_1$ which is formed by the tubular body 1, with a first engaging means arranged between the guide member and the lens holder member 7 and constructed in the form of a pin member $11b_1$, $11b_2$ and an elongated slot $7a_1$, $7a_2$ with an eccentric adjusting member 12 having an eccentric pin $12b$ in engagement with a tranverse slot $7b$ of the lens holder member 7. After the position of the holder member 7 has been adjusted, the guide member 11 will be rigidly constrained relative to the lens holder member 7 and at the same time the eccentric adjusting member 12 is restrained from undesired accidental movement.

In actual practice, the arrangement of the present invention allows the parts thereof, including the guide member 11, the lens holder member 7 (7A) and the eccentric adjusting member 12 to be made from synthetic resin material by molding means, thereby providing advantages from the point of view of economy of manufacture. Of course, it is to be understood that various modifications of the specific embodiments described herein are possible and, for example, the guide member 11 could be provided with elongated slots equivalent to the slots $7a_1$ and $7a_2$. Furthermore, pins equivalent to the pins $11B_1$ and $11B_2$ may be provided on the lens holder 7. It will be apparent to those skilled in the art that modifications may be selected depending upon the convenience of manufacturing various constituents and the processes of assembly thereof.

Figure 7:
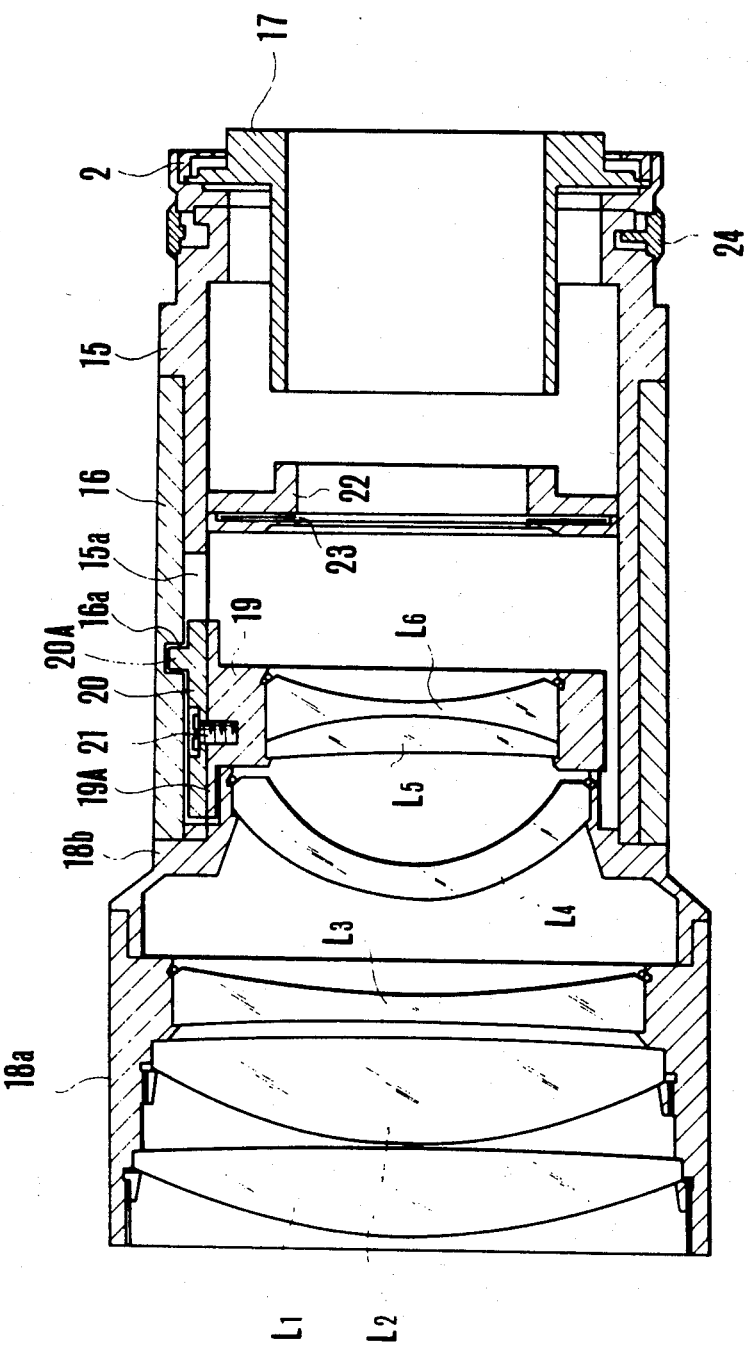
FIG. 7 is an axial sectional view of a further embodiment of the invention applied to a focusing member arrangement.

FIG. 7 depicts an example for application of the principles of the position adjusting device for a moveable lens holder member in a zoom lens mounting in accordance with the devices depicted in FIGS. 3–6 for a focusing lens holder in the standard lens mounting.

As shown in FIG. 7, a fixed barrel 15 is provided with a bayonet mount or other suitable mounting means 2 at the rear end thereof. A focusing ring 16 is rotatably fitted on the fixed barrel 15 and a straight guide slot $15a$ is formed to extend in a direction along the optical axis of the lens assembly. An adapter member 17 is provided for determining the position of the lens mounting relative to an attachment reference surface on a camera housing when the lens assembly is to be attached to the camera body. The fixed barrel 15 and the adapter member 17 are arranged to be rotatable relative to each other and upon setting or resetting thereof they are constrained from relative rotation by a locking mechanism (not shown) interposed therebetween. A mechanism of the type here referred to will not be described in detail but will be found disclosed and depicted in the prior art, particularly previously cited U.S. Pat. Nos. 4,247,190 and 4,230,403.

Lens mounting members $18a$ and $18b$ which support an image forming lens group comprising elements $L_1$-$L_4$ are fixedly secured to the tubular body 15. A lens mounting member 19 supports a focusing lens group of elements $L_5$-$L_6$ and a guide member 20 is fitted in the straight guide slot $15a$.

The lens mounting member 19 and the guide member 20 are formed in a manner similar to the parts 7 and 11 depicted and described in connection with the first embodiment disclosed herein. That is, the lens mounting member 19 operates not only to mount the lenses $L_5$ and $L_6$, but it also has a wall-like support portion 19A on the outer periphery thereof with the guide member 20 having parts similar to the pins $11B_1$ and $11B_2$, holes $11b$ and 11E, extension pin 11A and open slots $11d_1$ and $11d_2$ shown in FIG. $5(b)$.

A screw fastener 21 is provided for connecting the guide member 20 and the lens mounting member 19 together. Between the guide member 20 and the lens mounting member 19 there is an eccentric device similar to the member 12 shown in FIG. $5(d)$.

A cam groove $16a$ is formed on the inner surface of the focusing ring 16 in which an extension pin 20A is engaged. A part 22 of the lens assembly contains a known diaphragm unit 23 and is fixedly secured to the lens barrel 15. The diaphragm unit is arranged to cooperate with a diaphragm presetting ring 24 and also with a control mechanism (not shown) in the camera body by means of a transmission. The transmission is of the type well known in the art and therefore is not explained in detail herein.

In the construction of the lens mounting arrangement shown in FIG. 7, when the focusing lens group $L_5$, $L_6$ is in a position which deviates from a prescribed position, the operator needs only rotate the eccentric means in a manner similar to that previously described in connection with the embodiment of FIGS. $5(a)$-$5(d)$ and FIG. 6, until the lens mounting member 19 is adjusted to the prescribed position relative to the guide member 20. Then, the screw fastener 20 is tightened so that the lens mounting member 19 is rigidly affixed to the guide member 20 while at the same time the eccentric means is restrained from rotation and is sandwiched therebetween under pressure.

When the focusing ring 16 is rotated, due to the engagement of the projected pin portion 20A of the guide member 20 in the cam groove 16a, the guide member 20 will be axially moved a distance dependent upon the amount of rotation of the focusing ring 16 and will simultaneously carry the lens mounting member 19. Thus, movement of the focusing lens group $L_5$, $L_6$ results in a distance adjustment.

In the case of the embodiment of FIG. 7, the focal length is determined in accordance with design values of the lens elements $L_1$–$L_6$ and the total amount of rotation of the focusing ring 16 for the entire focusing range is thus determined. Since the cam groove 16a of the focusing ring 16, as well as the pin 20A and the spacers for the lens elements $L_5$ and $L_6$ in the lens mounting member 19 are shaped within certain rough tolerances by a machining process, there will generally arise a necessity for adjusting the axial position of the lens mounting member 19 relative to the tubular body. The device of the present invention enables this adjustment to be accurately and quickly achieved during the assembly process.

Figure 8:
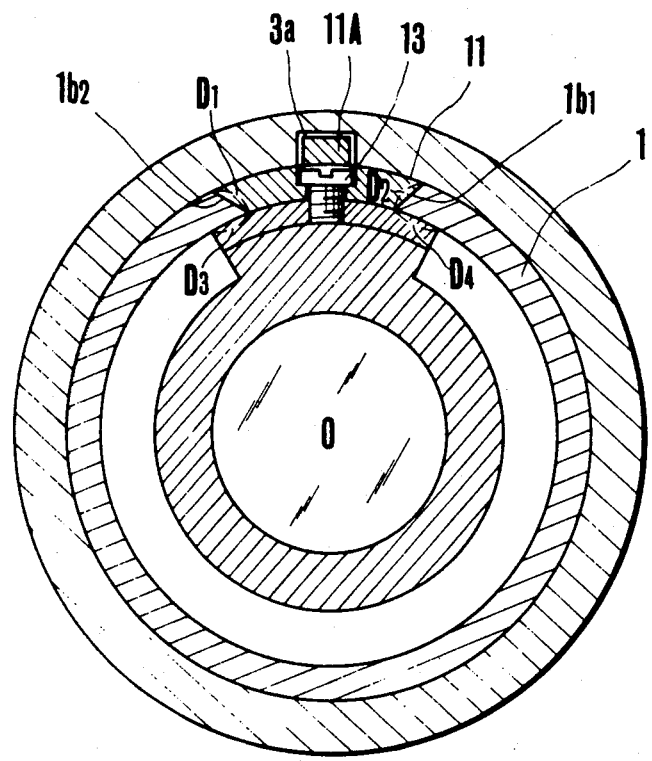
FIG. 8 is a transverse sectional view showing another example of a lens holder suspending mechanism.

FIG. 8 shows a holding mechanism for a lens mounting member 7, 19 of the type shown in FIG. 3 or FIG. 7. The embodiment depicted in FIG. 8 includes the feature that the contact surfaces of the guide member 11 and of the straight guide slot $1a_1$ of the tubular body 1 are tapered at an angle of inclination relative to the radial direction from the optical axis O, as indicated at $D_1$ and $D_2$. As a result, the lens mounting member 7 is mounted in suspended relationship on the tapered surfaces $D_1$ and $D_2$. Furthermore, the support portion 7A of the lens mounting member 7, 19 is made to contact with a portion of the inner surface of the tubular body 1.

The tapered surfaces $D_1$ and $D_2$ of the tubular body 1, and the sliding sections $D_3$ and $D_4$ of the inner surface thereof, are finished to a predetermined smoothness and the corresponding sliding sections of the guide member 11 and the mounting member 7 at the support portion 7A are also finished to a similar smoothness whereby it is possible to quickly and easily set the lens mounting member 7 in an accurately adjusted position relative to the optical axis or to the axis of the tubular body 1.

By employing the structure and arrangement of the lens mounting member 7 and of the guide member 11 as shown in FIG. 8, where the guide member 11 is supported by the tapered side surfaces $D_1$ and $D_2$ of the straight guide slot $1a_1$ of the tubular body, and by finishing each constituent to a smooth surface finish exceeding a certain precision, the centering of the lens mounting member 7 and quick setting thereof can be assured.

A further advantage of the embodiment of FIG. 8, as compared with conventional lens mounting arrangements wherein the entire area of the outer periphery of the lens mounting member contacts with the inner surface of the tubular body, is that production costs and adjustment difficulties of sliding friction may be significantly improved.

Naturally, it will be seen that the method of supporting the lens mounting member 7 on the guide member 11 in a suspending manner as shown in FIG. 8 may be employed in the arrangement of the focusing lens mounting member 19 of FIG. 7.

Figure 9:
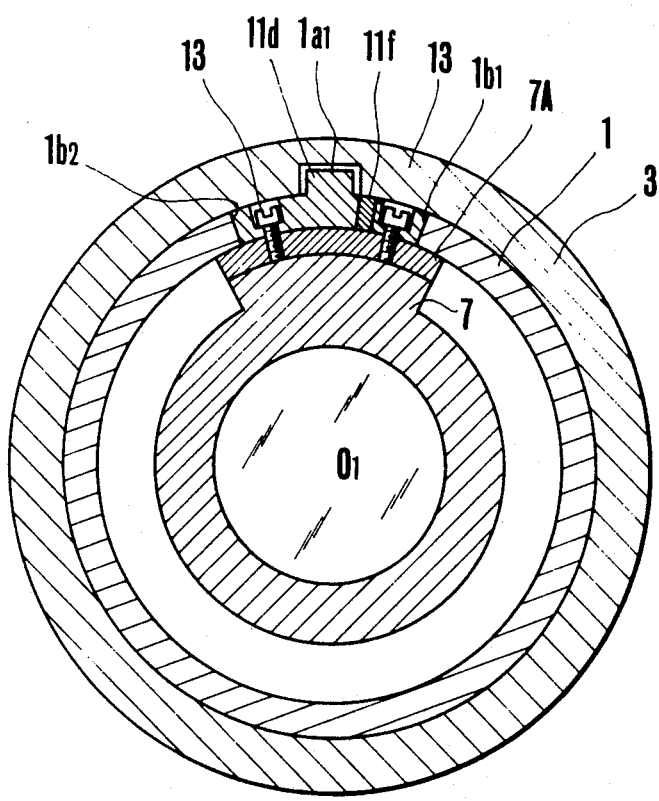
FIG. 9 is a sectional view showing a further example of a lens holder suspending mechanism.
Figure 10:
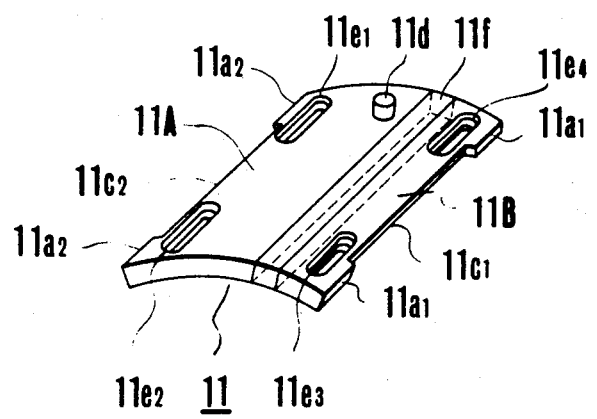
FIGS. 10 and 11 are perspective views showing parts of the embodiment of FIG. 9.
Figure 11:
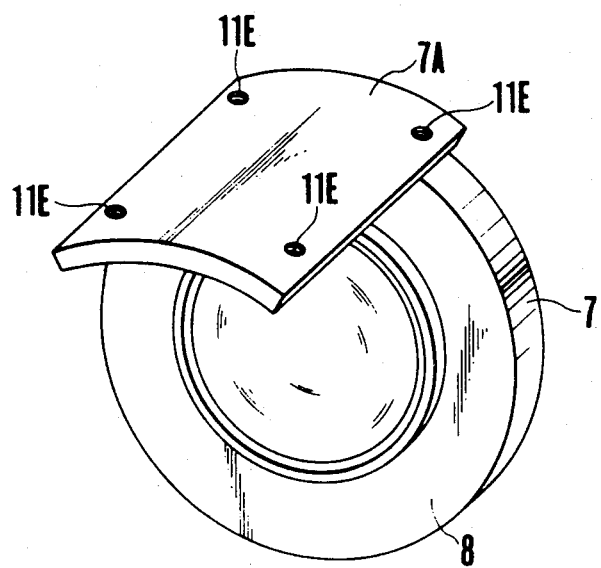

FIGS. 9–11 show an improved mechanism for holding the lens mounting member 7, 19 on the guide member 11, 20 in suspended relationship over the mechanism shown in FIG. 8.

In the case of an embodiment such as that shown in FIGS. 3 or 7, wherein the moveable member 7, 19 is driven to move by the guide member 11, 20 in fitted relationship with the straight guide slot $1a_1$, $15a$ and by the pin 11A, 20A engaging in the cam groove $3a$, $16a$, the dimensional precision of the various members should be maintained at a relatively high level otherwise sliding movement of the various members in the respective slots or grooves, particularly the guide member 11, 20 in the straight slot, will not occur with a suitable frictional force. However, with regard to actual production of the parts a somewhat rough tolerance must be made acceptable from the standpoint of production efficiency and cost.

In order to overcome this shortcoming, in accordance with the present invention, an improvement is provided which comprises an elastic member operatively arranged with the guide member in order to produce a sideward pressure on the sliding surfaces of the straight slot in order to provide the possibility for adjusting the sideward pressure to a desired level. Furthermore, provision of such an elastic member in the guide member may remove the possibility of the occurrence of a gap between the guide member and the straight slot. Considered in more detail, a slightly oversized guide member is assembled within the straight slot and the elastic member is then compressed so that the guide member is fitted in the straight slot with adjustment of the frictional force between the sliding side surfaces thereof.

In the embodiment depicted in FIGS. 9–11 similar reference numerals have been employed to denote parts similar to those shown in FIGS. 3–6. Thus, there is provided in FIGS. 9–11 a tubular body 1, a cam barrel 3, a lens mounting member 7 with a support portion 7A axially extending from the outer diameter of the mounting member 7 and a guide member 11 fitted in a straight guide slot of the tubular body 1.

FIG. 10 is a perspective view of a guide member formed in accordance with this embodiment of the invention. The guide member 11 is shown as divided into two parts 11A and 11B between which there is located an elastic member 11f made of rubber material or resinous material. The three parts are joined together in a unified member by adhering means in order to form the guide member 11. A projected pin 11d is provided on the guide member 11 for engagement in the cam groove in the inner surface of the cam barrel 3.

Elongated slots $11e_1$, $11e_2$, $11e_3$, and $11e_4$ are provided through which there may be received respective screw fasteners 13 which extend into engagement with threaded holes 11E in the support portion of the lens mounting member so that when the screw fasteners are tightened, the guide member will be rigidly secured to the lens mounting member. Contact areas $11a_1$ and $11a_2$ engage with the side surfaces of the straight guide slot of the tubular body and side cheeks $11C_1$ and $11C_2$ are located therebetween.

In the assembly process and adjusting method of this embodiment of the invention, the guide member 11 is first placed in the straight slot $1a_1$. Since the free size of the guide member 11 is larger than that of the straight slot $1a_1$, the guide member 11, when in a compressed state, will produce a pressure at the contact areas $11a_1$ and $11a_2$ on the side surfaces of the slot $1a_1$.

The guide member 11 is then preliminarily fastened with the support portion of the lens mounting member by the screws 13. A test is then performed by rotating the cam barrel 3. As the guide member 11 is axially moved in the pin-and-cam groove 11d, 3a, and in sliding fitted relationship to the straight guide slot 1a₁, a determination may be made of whether or not the frictional force is adequate. After adjustment of the frictional force, the screw fasteners 13 are further tightened so that the guide member 11 will be rigidly secured to the lens mounting member 7.

With the structure and arrangement described above, even when both the guide member 11 and the straight slot 3a have some dimensional error which may be cumulative, the sum of these errors may be absorbed by the elastic member 11f. Thus, the guide member and the straight slot will mate with each other in a very advantageous manner despite the fact that high dimensional tolerances during manufacturing are not maintained.

Figure 12:
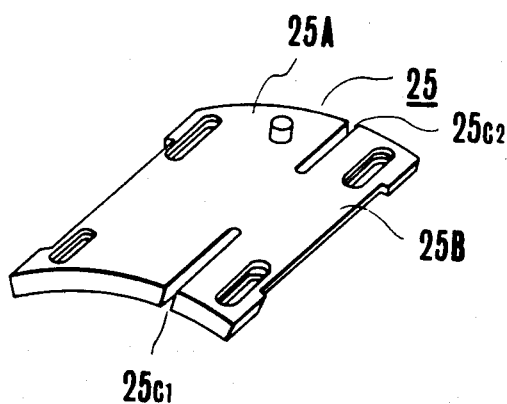
FIGS. 12 and 13 are perspective views showing parts of an adjustment system in accordance with other embodiments of the invention.
Figure 13:
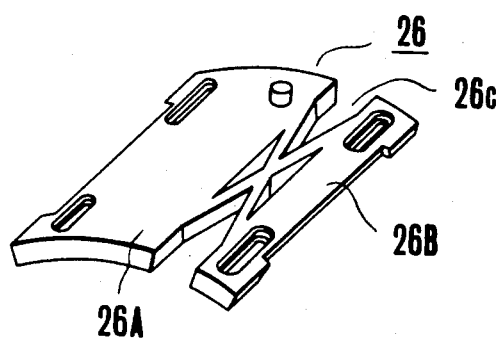

FIGS. 12 and 13 show examples of variations of the guide member 11.

In the examples of FIGS. 12 and 13 the guide member is adapted to have its rigid and resilient portions made of synthetic resin material with the engagement pin portions being formed by molding techniques. The guide member 25 or 26 has right and left rigid portions 25A and 25B, or rigid portions 26A and 26B between which there is a resilient portion in the form of either open slots $25C_1$ and $25C_2$ or crossed bars 26C.

It should be noted that each of the guide members 25 and 26 of FIGS. 12 and 13, respectively, lack the sideward pressure adjusting function such as that described in connection with the embodiment of FIGS. 9–11 and therefore the resilient force of the resilient portions $25C_1$, $25C_2$ or 26C will be applied to the side surfaces of the straight slot without requiring further alteration.

While specific embodiments of the invention have been shown and described in detail to illustrate the application of the inventive principles, it will be understood that the invention may be embodied otherwise without departing from such principles.

What is claimed is:

1. An adjusting mechanism in a mechanical mounting arrangement for a lens assembly including movable lens groups, comprising:
   (a) a cylindrical member having a first guide groove for controlling axial movement of said movable lens groups of said lens assembly;
   (b) a lens mounting member for mounting said movable lens groups;
   (c) a cam member having a cam groove which crosses said first guide groove of said cylindrical member rotatable around the optical axis of said assembly by actuation from the exterior thereof; and
   (d) adjusting means for adjusting the position of said lens mounting member on the optical axis, said adjusting means consisting of a guide member, eccentric means and a connecting member, a portion of said guide member being insertedly fitted at the crossing point of said cam groove and said first guide groove, said guide member and said lens mounting member being joined in assembly in such a manner that rotation thereof around the optical axis is restrained and shifting thereof is possible in the direction parallel to the optical axis, said eccentric means having an adjusting pin engaging with a transverse slot provided at one of said lens mounting member or said guide member, said eccentric means being inserted into a hole provided at one of said guide member or said lens mounting member, said guide member and said lens mounting member being connected by the lens mounting member.

2. An adjusting mechanism according to claim 1 wherein said guide member is insertedly fitted into said first guide groove of said cylindrical member, said guide member and said first guide groove having contacting surfaces which are finished into tapered surfaces.

3. A lens assembly according to claim 2 wherein said guide member includes resilient portions for exerting a spring force on said guide means.

4. A lens assembly according to claim 3 wherein said guide member comprises two rigid portions and a resilient portion intervening between said two rigid portions.

5. A lens assembly for mounting a movable lens comprising:
   (a) a cylindrical member having a straight guide slot for axial movement of said movable lens, said guide slot having side surfaces finished to tapered surfaces;
   (b) a guide member fitted in said straight guide slot having side surfaces finished to tapered surfaces for surface contact with said tapered surfaces of said straight guide slot, said guide member having a resilient portion which develops a biasing force between said guide member and said cylindrical member;
   (c) a lens mounting member for mounting said movable lens, said lens mounting member having one portion in surface contact with the inner peripheral surface of said cylindrical member, with said lens mounting member being held in said cylindrical member in fixedly secured relation to said guide member; and
   (d) means for moving said guide member in a direction along the optical axis of said lens assembly by operation from the exterior of said lens assembly, said moving means having an operational member fitted on the outer diameter of said cylindrical member, with a cam for engagement with engaging means provided in said guide member being formed in the operational member, and with movement of said guide member being controlled by operation of said operational member.

6. A lens assembly according to claim 4 wherein after said guide member is fitted in said guide means, said guide member and said lens mounting member are connected with each other so as to obviate the action of the spring force of said guide member.

7. A device for adjusting the position of a lens mounting member in a zoom lens mounting mechanism, comprising:
   (a) a cylindrical member having guide groove for controlling axial movement of said lens mounting member;
   (b) a cam member having a cam cooperative with said guide groove for controlling axial movement of said lens mounting member to change image magnification; and
   (c) adjusting means to adjust the position of the lens mounting member on the optical axis, said adjusting means consisting of a guide member, eccentric means, and a connecting member, wherein a portion of said guide member is insertedly fitted with a crossing point of the guide groove and the cam groove and at the same time the guide member and the lens mounting member are joined in assembled relationship in a manner so as to be capable of being shifted in the direction of the optical axis, said eccentric means being inserted into a hole provided in one of the guide member or the lens mounting member, with an adjusting pin of said eccentric means engaging with a transverse slot provided in one of the lens mounting member or the guide member, said connecting member connecting said guide member and said lens mounting member.

* * * * *